US012346081B2

(12) United States Patent
Tonoue et al.

(10) Patent No.: US 12,346,081 B2
(45) Date of Patent: Jul. 1, 2025

(54) SAFETY SIGNAL OUTPUT DEVICE, ATTACHMENT MEMBER, SAFETY SYSTEM, AND METHOD FOR DISABLING MONITORING

(71) Applicant: Kawasaki Jukogyo Kabushiki Kaisha, Kobe (JP)

(72) Inventors: Yoshiaki Tonoue, Kobe (JP); Kazuhiro Uekita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 599 days.

(21) Appl. No.: 17/784,681

(22) PCT Filed: Dec. 10, 2020

(86) PCT No.: PCT/JP2020/046067
§ 371 (c)(1),
(2) Date: Jun. 13, 2022

(87) PCT Pub. No.: WO2021/117815
PCT Pub. Date: Jun. 17, 2021

(65) Prior Publication Data
US 2023/0004134 A1 Jan. 5, 2023

(30) Foreign Application Priority Data
Dec. 13, 2019 (JP) ................. 2019-225085

(51) Int. Cl.
*G05B 19/048* (2006.01)
(52) U.S. Cl.
CPC ................ *G05B 19/048* (2013.01)

(58) Field of Classification Search
CPC ......... G05B 19/048; G05B 9/02; B25J 9/1674
See application file for complete search history.

(56) References Cited

U.S. PATENT DOCUMENTS

| 9,343,860 B2* | 5/2016 | Zomchek ............. H01R 31/005 |
| 10,503,137 B2* | 12/2019 | Gehrke ................... G05B 9/02 |
| 2016/0136814 A1* | 5/2016 | Garde ................. G05B 19/406 |
| | | 700/264 |
| 2018/0364670 A1* | 12/2018 | Dotson .................. H01H 19/64 |

FOREIGN PATENT DOCUMENTS

| JP | 7-65908 A | 3/1995 |
| JP | 2013-36816 A | 2/2013 |

* cited by examiner

*Primary Examiner* — Zhipeng Wang
(74) *Attorney, Agent, or Firm* — XSENSUS LLP

(57) ABSTRACT

A safety signal output device has a connector that can electrically connect a second device different from a first device. The connector includes first through fourth terminals. The safety signal output device outputs electrical signals with different timings to the first terminal and the third terminal. The safety signal output device outputs a safety signal during a state in which electrical signals that correspond in timing to the output timing of the electrical signals to the first terminal are input to the safety signal output device from the fourth terminal, and electrical signals that correspond in timing to the output timing of the electrical signals to the third terminal are input to the safety signal output device from the second terminal, the safety signal output device outputs the safety signal.

7 Claims, 6 Drawing Sheets

(a) monitoring robot main body (b) monitoring external axis device (a) monitoring robot main body (b) monitoring external axis device

SAFETY SIGNAL OUTPUT DEVICE, ATTACHMENT MEMBER, SAFETY SYSTEM, AND METHOD FOR DISABLING MONITORING

CROSS-REFERENCE TO RELATED APPLICATIONS

This application is based on PCT filing PCT/JP2020/046067, filed on Dec. 10, 2020, and claims priority to and the benefit of Japanese Patent Application No. 2019-225085 filed on Dec. 13, 2019, the entire contents of each are incorporated herein by reference.

TECHNICAL FIELD

This invention relates primarily to a safety signal output device that monitors input of electrical signals and outputs a safety signal.

BACKGROUND ART

Conventionally, as shown in FIG. 6, a robot system having: a device 100 including a robot or the like; and a control device 110 for controlling the device 100, has been known. The control device 110 includes a safety mechanism 120 for stopping (emergency stop) the device 100. PTL 1 discloses a configuration for this type of robot system.

The configuration of PTL 1 includes: a control panel for controlling the operation of the robot and the like; and an operation box for teaching and other operation of the robot and the like. The control panel has an emergency stop circuit and a power circuit that control the operation of the robot and the like. The control panel includes a relay that turns the power circuit on and off in parallel with the emergency stop circuit. The emergency stop circuit is connected to the B-contact switch in the operation box via a connector and a lead wire. When the operation box is attached on the control panel, the emergency stop circuit is operated by the B-contact switch in the operation box. On the other hand, when the operation box is detached from the control panel, the emergency stop circuit is short-circuited by the B-contact of the relay, so that the emergency stop circuit is not in a state to output an emergency stop signal.

PRIOR-ART DOCUMENTS

Patent Documents

PTL 1: Japanese Patent Application Laid-Open No. 07-065908 (1995)

SUMMARY OF THE INVENTION

Problems to be Solved by the Invention

In the configuration of PTL 1 described above, when the operation box is disconnected from the control panel, operation of robot and the like (disabling emergency stop) can be realized. However, if a failure occurs in the B-contact switch in the operation box connected to the control panel and the B-contact switch becomes always closed, the state is no different from that in which the operation box is detached from the control panel, and the emergency stop cannot be performed when necessary.

In addition, in the case of a configuration in which a safety circuit is provided such that the operation is not allowed until it is confirmed that a switch (for example, a pressure switch) is once opened and then closed, the means of disabling operation by a simple short circuit cannot be applied for the safety circuit.

The present invention is made in view of the circumstances, described above, and an object of the present invention is to properly disable monitoring of electrical signals with a simple configuration.

Means for Solving the Problems

The problem to be solved by the present invention is as described above, and next, means for solving the problem and effects thereof will be described.

In a first aspect of the present invention, a safety signal output device having the following configuration is provided. That is, this safety signal output device monitors electrical signals of a plurality of systems input from a first device and outputs a safety signal based on a result of the monitoring. The safety signal output device has a connector to which a second device different from the first device can be electrically connected. The connector includes at least a first terminal, a second terminal, a third terminal, and a fourth terminal. The safety signal output device outputs electrical signals with different timing to the first terminal and the third terminal respectively. If the electrical signal is not input from the first device to the safety signal output device in at least one of the plurality of systems, the safety signal output device does not output the safety signal. If the electrical signals are input to the safety signal output device from the first device in all of the plurality of systems, the safety signal output device operates as follows (1) to (3). (1) During a first state in which electrical signals that correspond in timing to the output timing of the electrical signals to the first terminal are input to the safety signal output device from the second terminal, and electrical signals that correspond in timing to the output timing of the electrical signals to the third terminal are input to the safety signal output device from the fourth terminal, the safety signal output device outputs the safety signal. (2) During a second state in which electrical signals that correspond in timing to the output timing of the electrical signals to the first terminal are input to the safety signal output device from the fourth terminal, and electrical signals that correspond in timing to the output timing of the electrical signals to the third terminal are input to the safety signal output device from the second terminal, the safety signal output device outputs the safety signal. (3) Even when electrical signals are input to the safety signal output device from the first device in all of the plurality of systems, during a state different from either the first state or the second state, the safety signal output device does not output the safety signal.

Accordingly, by electrically connecting the first terminal and the fourth terminal and electrically connecting the third terminal and the second terminal of the connector, the electrical signal monitoring can be properly disabled.

In a second aspect of the present invention, the following method for disabling monitoring in a safety signal output device is provided. That is, this safety signal output device monitors electrical signals of a plurality of systems input from a first device. The safety signal output device can monitor electrical signals of a plurality of systems output from a second device different from the first device. The safety signal output device includes a connector to which the second device can be electrically connected. The connector includes at least a first terminal, a second terminal, a third terminal, and a fourth terminal. The safety signal output device outputs a safety signal based on a result of the monitoring. By the method for disabling monitoring, the monitoring of electrical signals at the connector is disabled. The safety signal output device is configured so that, when electrical signals are input to the safety signal output device from the first device in all of the plurality of systems, in a state in which electrical signals corresponding to the output timing of the electrical signals to the first terminal are input to the safety signal output device from the second terminal or the fourth terminal, and electrical signals corresponding to the output timing of the electrical signals to the third terminal are input to the safety signal output device from the fourth terminal or the second terminal, the safety signal output device outputs the safety signal. In the method, by attaching an attachment member to the connector, the first terminal and the fourth terminal are electrically connected, and the third terminal and the second terminal are electrically connected.

This allows properly disabling the monitoring of electrical signals by the simple configuration of connecting the attachment member to the connector.

Effects of the Invention

According to the invention, the monitoring of electrical signals can be properly disabled with a simple configuration.

EMBODIMENT FOR CARRYING OUT THE INVENTION

Figure 1:
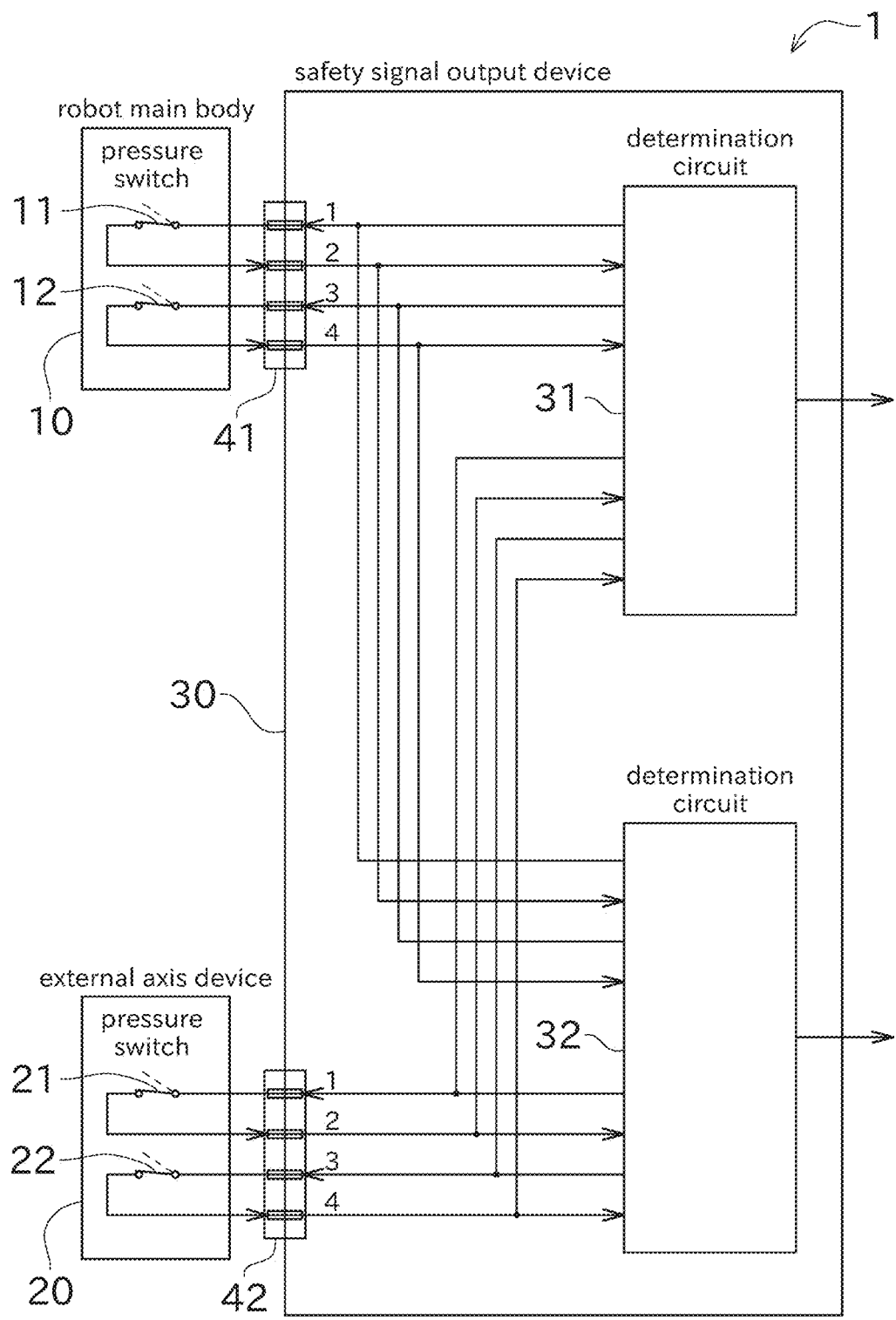
FIG. 1 is a schematic diagram of a safety system according to one embodiment of the present invention.

Next, the embodiments of the present invention will be described with reference to the drawings. FIG. 1 is a schematic diagram of a safety system 1 according to one embodiment of the present invention.

The safety system 1 shown in FIG. 1 includes a robot main body (first device) 10, an external axis device (second device) 20, and a safety signal output device 30. The robot main body 10 and the external axis device 20 perform a predetermined task. In this embodiment, the robot main body 10 and the external axis device 20 are applied to a painting task, but can also be used for other tasks.

The robot main body 10 is installed in a painting booth. The robot main body 10 includes an arm not shown. This arm is driven by a plurality of electric motors, not shown. A spray gun is attached to the end of the arm, which allows painting while controlling the position and orientation of the spray gun with respect to a workpiece.

The external axis device 20 is installed in the painting booth. The external axis device 20 drives an electric motor which is different from the electric motors of the robot main body 10 to move the workpiece linearly, for example. This allows, for example, efficient painting of long shaped workpieces.

In both the robot main body 10 and the external axis device 20, the electric motors and the like (not shown) are surrounded by a cover or the like so that they are not exposed to the painting booth. Air from outside the painting booth is constantly supplied to the inside of the cover through air piping, not shown, to maintain positive pressure. This space is hereinafter referred to as the positive pressure space. This provides explosion protection for the painting task using paints and solvents.

The robot main body 10 includes pressure switches 11, 12. The pressure switches 11, 12 are located in the positive pressure space of the robot main body 10. The pressure switches 11, 12 are configured to close their contacts when the detected pressure is equal to or above a predetermined value and to open their contacts when the detected pressure is below the predetermined value. If the pressure in the positive pressure space drops due to an abnormality in the air piping, for example, the pressure switches 11 and 12 open. This allows detection of whether or not predetermined pressure is maintained by the air piping.

The external axis device 20 includes pressure switches 21, 22. The pressure switches 21, 22 are located in the positive pressure space of the external axis device 20. The configuration and function of the pressure switches 21, 22 are similar to the pressure switches 11, 12 of the robot main body 10, therefore, a detailed description is omitted.

To achieve duplexing, the two pressure switches 11, 12 of the robot main body 10 are provided. The same applies to the two pressure switches 21, 22 of the external axis device 20.

The pressure switches 11, 12 of the robot main body 10 are electrically connected to the safety signal output device 30 via the first connector 41. A cable is connected between the robot main body 10 and the first connector 41, which allows the input and output of signals. The pressure switches 21, 22 of the external axis device 20 are electrically connected to the safety signal output device 30 via the second connector (connector) 42. A cable is connected between the external axis device 20 and the second connector 42, which allows the input and output of signals.

The first connector 41 has a plurality of terminals. The plurality of terminals include at least a first terminal, a second terminal, a third terminal, and a fourth terminal. In FIG. 1, numerals corresponding to the first through fourth terminals of the first connector 41 are illustrated. Each of the terminals of the first connector 41 will be described below.

The first terminal is a terminal for outputting pulse signals from the safety signal output device 30 to the pressure switch 11 of the robot main body 10.

The second terminal is a terminal for inputting pulse signals from the pressure switch 11 of the robot main body 10 to the safety signal output device 30.

The third terminal is a terminal for outputting pulse signals from the safety signal output device 30 to the pressure switch 12 of the robot main body 10.

The fourth terminal is a terminal for inputting pulse signals from the pressure switch 12 of the robot main body 10 to the safety signal output device 30.

Like the first connector 41, the second connector 42 also has a plurality of terminals. The plurality of terminals include at least a first terminal, a second terminal, a third terminal, and a fourth terminal. In FIG. 1, numerals corresponding to the first through fourth terminals of the second connector 42 are illustrated. Each of the terminals of the second connector 42 will be described below.

The first terminal is a terminal for outputting pulse signals from the safety signal output device 30 to the pressure switch 21 of the external axis device 20.

The second terminal is a terminal for inputting pulse signals from the pressure switch 21 of the external axis device 20 to the safety signal output device 30.

The third terminal is a terminal for outputting pulse signals from the safety signal output device 30 to the pressure switch 22 of the external axis device 20.

The fourth terminal is a terminal for inputting pulse signals from the pressure switch 22 of the external axis device 20 to the safety signal output device 30.

The operation of the robot main body 10 and the external axis device 20 is controlled based on control signals output by a controller not shown. In each of the robot main body 10 and the external axis device 20, electric power to drive the electric motors and the like is supplied from the power supply on the condition that the safety signal output device 30 is outputting safety signals. When the safety signal output device 30 stops outputting the safety signals, the power supply to the robot main body 10 and the external axis device 20 is immediately cut off. When the safety signal output device 30 stops outputting the safety signals, the aforementioned controller immediately stops the operation of the electric motors of the robot main body 10 and the external axis device 20. This allows the robot main body 10 and the external axis device 20 to quickly go to an emergency stop state.

Depending on the contents of the painting task, there may be cases in which the external axis device 20 is not required and the painting task can be performed without problems by the robot main body 10 alone. In such cases, the external axis device 20 can be omitted.

The safety signal output device 30 has determination circuits (determination units) 31, 32. Each of the determination circuits 31, 32 includes logic circuits. Each of the determination circuits 31, 32 monitors electric signals with respect to the pressure in the positive pressure space of the robot main body 10 and the pressure in the positive pressure space of the external axis device 20.

First, monitoring of the electrical signals related to the pressure in the positive pressure space of the robot main body 10 will be described.

The determination circuit 31 outputs appropriate pulse signals to the first terminal of the first connector 41. The determination circuit 31 also determines whether pulse signals corresponding to this output are input from the second terminal of the first connector 41. The pulse signal is a type of electrical signal. The pulse signal that the determination circuit 31 outputs to the first terminal of the first connector 41 can be, for example, a rectangular pulse signal whose voltage level switches from H to L for a short period of time. The determination circuit 32 operates in the same way as the determination circuit 31. If there is no failure or other abnormality in the pressure switch 11 and the positive pressure space of the robot main body 10 is equal to or above the predetermined pressure, pulse signals that switch at the same timing as the pulse signals output by the determination circuit 31 or 32 to the first terminal would be input to the determination circuit 31 or 32 via the second terminal.

The determination circuit 31 outputs pulse signals to the third terminal of the first connector 41. The determination circuit 31 also determines whether pulse signals corresponding to this output are input from the fourth terminal of the first connector 41. The determination circuit 32 operates in the same way as the determination circuit 31. If there is no failure or other abnormality in the pressure switch 12 and the positive pressure space of the robot main body 10 is equal to or above the predetermined pressure, pulse signals that switch at the same timing as the pulse signals output by the determination circuit 31 or 32 to the third terminal would be input to the determination circuit 31 or 32 via the fourth terminal.

Figure 2:
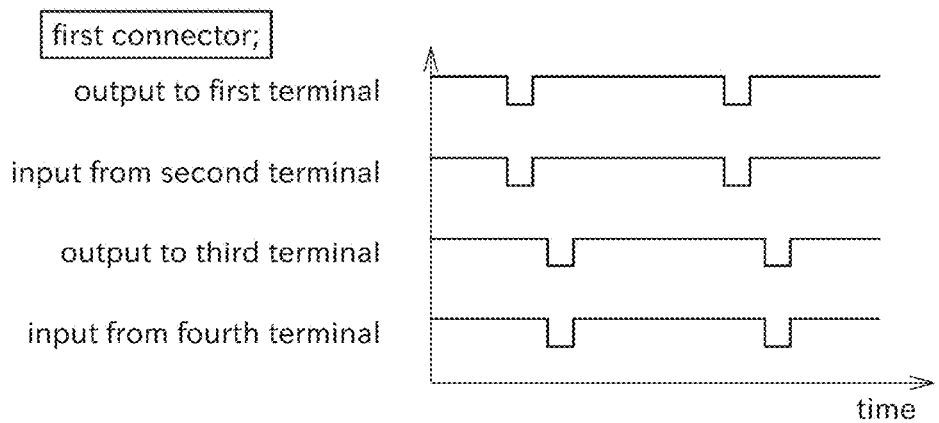
FIG. 2 is a graph showing the relationship between the pulse signals output by the safety signal output device to monitor the state of the duplexed pressure switches and the pulse signals input from the pressure switches to the safety signal output device.
Figure 2:
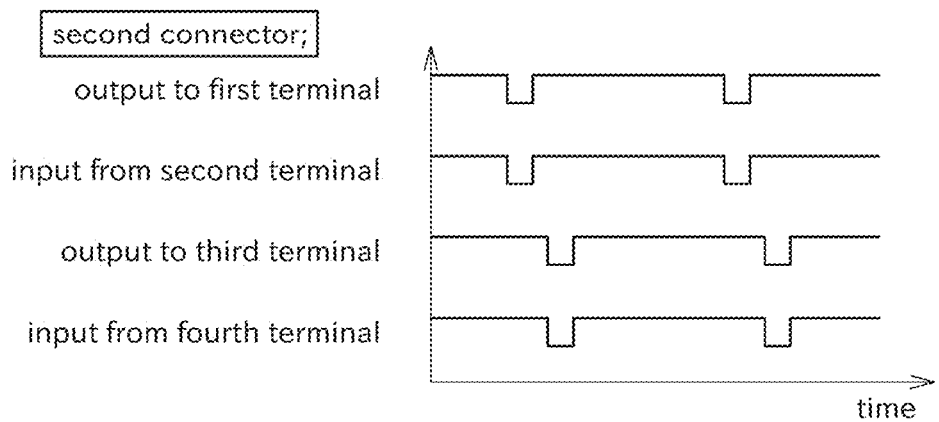

The determination circuit 31 outputs pulse signals to the first terminal and the third terminal of the first connector 41 periodically and repetitively, as shown in FIG. 2(a). The determination circuit 31 also monitors the voltage levels of the second terminal and the fourth terminal. The determination circuit 32 operates in the same manner as the determination circuit 31. In this way, the electrical signals of two systems input from the robot main body 10 can be monitored.

FIG. 2(a) shows the relationship between the pulse waveforms output from the determination circuits 31, 32 to the first terminal and the third terminal of the first connector 41 and the pulse waveforms input to the determination circuits 31, 32 from the second terminal and the fourth terminal. As shown in this graph, if pulse signals with the same timing as the pulse signals output from the determination circuit 31 or 32 to the first terminal of the first connector 41 are input from the second terminal to the determination circuit 31 or 32, and if pulse signals with the same timing as the pulse signals output from the determination circuit 31 or 32 to the third terminal are input from the fourth terminal to the determination circuit 31 or 32, it is normal with respect to the monitoring of the pressure switches 11 and 12.

Next, monitoring of electrical signals related to the pressure in the positive pressure space of the external axis device 20 will be described.

The determination circuit 31 outputs pulse signals to the first terminal of the second connector 42. The determination circuit 31 also determines whether pulse signals corresponding to this output are input from the second terminal of the second connector 42. The determination circuit 32 operates in the same way as the determination circuit 31. If there is no failure or other abnormality in the pressure switch 21 and the positive pressure space of the external axis device 20 is equal to or above the predetermined pressure, pulse signals that switch at the same timing as the pulse signals output by the determination circuit 31 or 32 to the first terminal would be input to the determination circuit 31 or 32 via the second terminal.

The determination circuit 31 outputs pulse signals to the third terminal of the second connector 42. The determination circuit 31 also determines whether the pulse signals corresponding to this output are input from the fourth terminal of the second connector 42. The determination circuit 32 operates in the same manner as the determination circuit 31. If there is no failure or other abnormality in the pressure switch 22 and the positive pressure space of the external axis device 20 is equal to or above the predetermined pressure, pulse signals that switch at the same timing as the pulse signals output by the determination circuit 31 or 32 to the third terminal would be input to the determination circuit 31 or 32 via the fourth terminal.

The determination circuit 31 outputs pulse signals to the first terminal and the third terminal of the second connector 42 periodically and repetitively, as shown in FIG. 2(b). The determination circuit 31 also monitors the voltage levels of the second terminal and the fourth terminal. The determination circuit 32 operates in the same manner as the determination circuit 31. In this way, the electrical signals of two systems input from the external axis device 20 can be monitored.

FIG. 2(b) shows, in the state where the external axis device 20 is connected to the second connector 42, the relationship between the pulse waveforms output from, for example, the determination circuits 31 to the first terminal and the third terminal of the second connector 42 and the pulse waveforms input to the determination circuits 31 from the second terminal and the fourth terminal. As shown in this graph, if pulse signals with the same timing as the pulse signals output from the determination circuit 31 or 32 to the first terminal of the second connector 42 are input from the second terminal to the determination circuit 31 or 32, and if pulse signals with the same timing as the pulse signals output from the determination circuit 31 or 32 to the third terminal are input from the fourth terminal to the determination circuit 31 or 32, it is normal with respect to the monitoring of the pressure switches 21 and 22.

As shown in FIG. 2(b), the timing of the pulse signal output by the determination circuit 31 to the first terminal of the second connector 42 and the timing of the pulse signal output to the third terminal are different from each other. The same is true for the determination circuit 32. This will be described later in detail.

To achieve duplexing, the two determination circuits 31, 32 each of which can output a safety signal are provided. As a result, the safety signal output device 30 can output safety signals in two systems. By configuring so that the emergency stop state described above appears if a safety signal is not output from even one of the two systems, reliability can be improved.

Next, disabling the monitoring when the external axis device 20 is not used will be described.

Whether or not the external axis device 20 is used is optional, as described above. The safety signal output device 30 can be applied both when the external axis device 20 is used and when it is not used.

When the external axis device 20 is not used, if the external axis device 20 is left removed from the second connector 42 simply, the state is substantially the same as the pressure switches 21, 22 is open in FIG. 1. In this case, the determination circuits 31, 32 cannot output the safety signals (in other words, the robot main body 10 cannot be operated).

Figure 3:
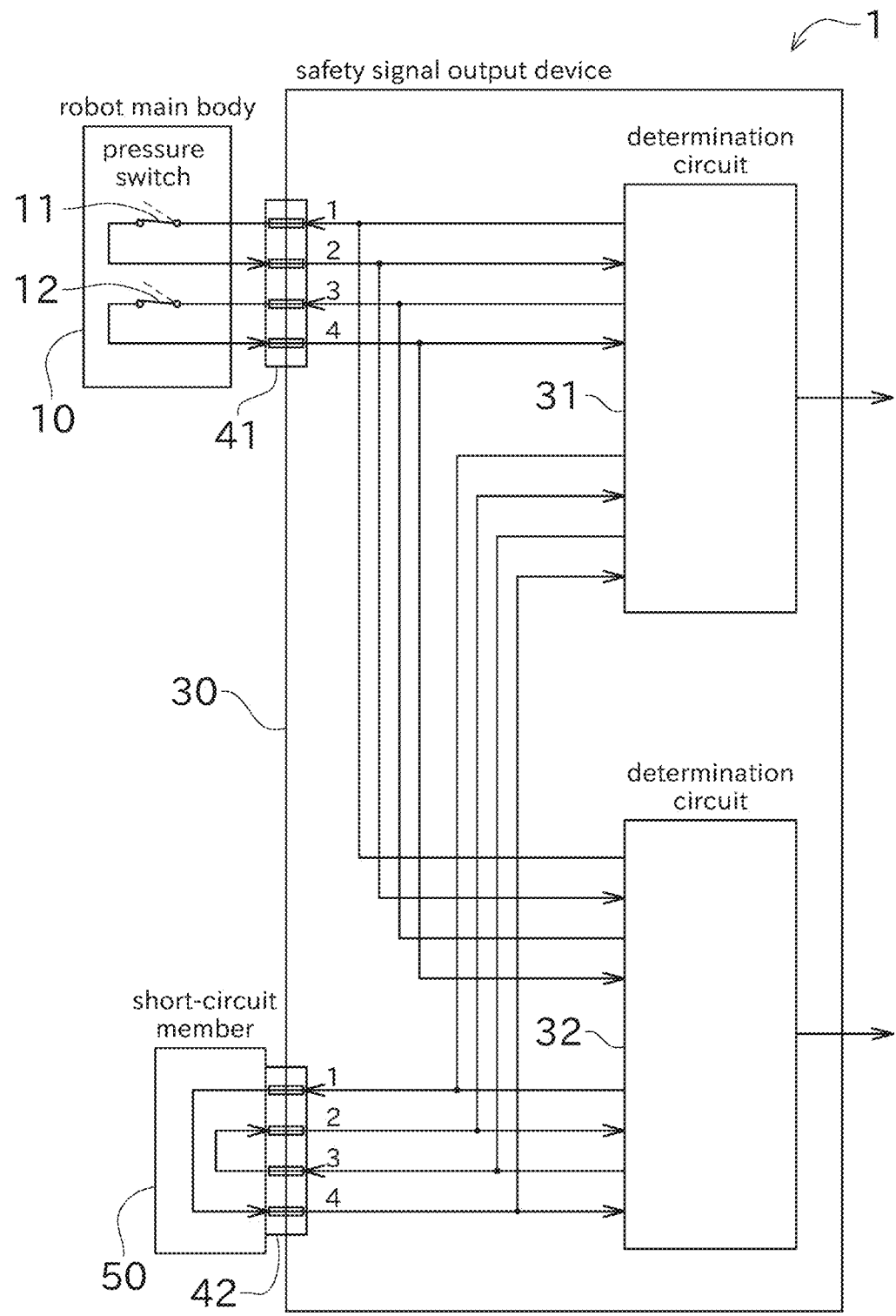
FIG. 3 is a diagram showing a state where an external axis device is not used and a short-circuit member is attached.

In the safety system 1 of this embodiment, when the external axis device 20 is not used, as shown in FIG. 3, a short-circuit member (attachment member) 50 can be attached to the second connector 42 of the safety signal output device 30. The short-circuit member 50 is a component of the safety system 1.

The short-circuit member 50 can be attached to and detached from the second connector 42. In the state shown in FIG. 3, where the short-circuit member 50 is attached to the second connector 42, the first terminal of the second connector 42 is electrically connected to the fourth terminal and the third terminal is electrically connected to the second terminal.

Figure 4:
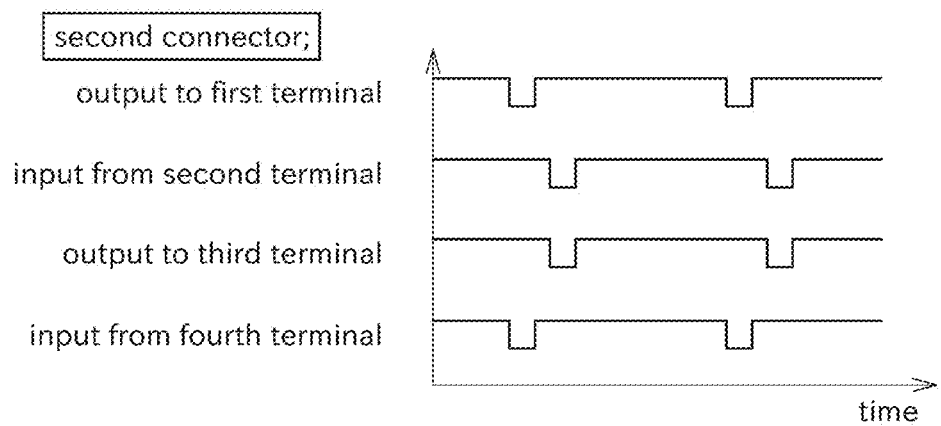
FIG. 4 is a graph showing the pulse signals when the monitoring with respect to the second connector is disabled by the short-circuit member.

Accordingly, when the short-circuit member 50 is attached to the second connector 42, as shown in FIG. 4, pulse signals with the same timing as the pulse signals output from the determination circuits 31, 32 to the first terminal of the second connector 42 are input from the fourth terminal to the determination circuits 31, 32. In addition, pulse signals with the same timing as the pulse signals output from the determination circuits 31, 32 to the third terminal of the second connector 42 are input from the second terminal to the determination circuits 31, 32.

Whether the external axis device 20 is connected to the second connector 42 or the short-circuit member 50 is connected to the second connector 42, the determination circuits 31, 32 periodically output pulse signals with different timing (in other words, different phases) from each other to the first terminal and the third terminals of the second connector 42.

Therefore, when pulse signals are input from the second terminal of the second connector 42 to the determination circuits 31, 32, it is easy to determine whether the pulse signals are based on pulse signals output from the determination circuits 31, 32 to the first terminal in the state shown in FIG. 1 or based on pulse signals output from the determination circuits 31, 32 to the third terminal in the state shown in FIG. 3, according to timing of the pulse signals.

In addition, when pulse signals are input from the fourth terminal of the second connector 42 to the determination circuits 31, 32, it is easy to determine whether the pulse signals are based on pulse signals output from the determination circuits 31, 32 to the third terminal in state shown in FIG. 1 or based on pulse signals output from the determination circuits 31, 32 to the first terminal in state shown in FIG. 3, according to timing of pulse signals.

In summary, each of the determination circuits 31, 32 outputs the safety signal when the following [1] is satisfied and [2] or [3] is satisfied. Otherwise, each of them does not output the safety signal. [1] Pulse signals with the same timing as the pulse signals output from the determination circuit 31 or 32 to the first terminal of the first connector 41 are input from the second terminal to the determination circuit 31 or 32, and pulse signals with the same timing as the pulse signals output from the determination circuit 31 or 32 to the third terminal are input from the fourth terminal to the determination circuit 31 or 32 (FIG. 2(a)). [2] Pulse signals with the same timing as the pulse signals output from the determination circuit 31 or 32 to the first terminal of the second connector 42 are input from the second terminal to the determination circuit 31 or 32, and pulse signals with the same timing as the pulse signals output from the determination circuit 31 or 32 to the third terminal are input from the fourth terminal to the determination circuit 31 or 32 (FIG. 2(b)). [3] Pulse signals with the same timing as the pulse signals output from the determination circuit 31 or 32 to the first terminal of the second connector 42 are input from the fourth terminal to the determination circuit 31 or 32, and pulse signals with the same timing as the pulse signals output from the determination circuit 31 or 32 to the third terminal are input from the second terminal to the determination circuit 31 or 32 (FIG. 4).

Comparing the graphs between FIG. 2(b) and FIG. 4, the two graphs are similar in that pulse signals input from the second terminal of the second connector 42 to the determination circuits 31, 32 and pulse signals input from the fourth terminal to the determination circuits 31, 32 are alternating. In this regard, the above condition of "[2] or [3]" can be rephrased by the following condition of [A]. [A] Pulse signals input from the second terminal of the second connector 42 to the determination circuits 31, 32 and pulse signals input from the fourth terminal to the determination circuits 31, 32 are alternating.

By this configuration, with little additional special hardware configuration in the safety signal output device 30, by attaching the short-circuit member 50 having a simple configuration, the monitoring on the second connector 42 side can be disabled. Because the monitoring is intentionally altered between enabled and disabled using the short-circuit member 50, which is a physically present component, rather than altering the setting in software, the work is reliable and altering errors can be reduced. By configuring the second connector 42 in such a way that the external axis device 20 and the short-circuit member 50 cannot be attached to the second connector 42 at the same time, when the external axis device 20 is connected to the second connector 42, the monitoring can be reliably enabled.

Figure 5:
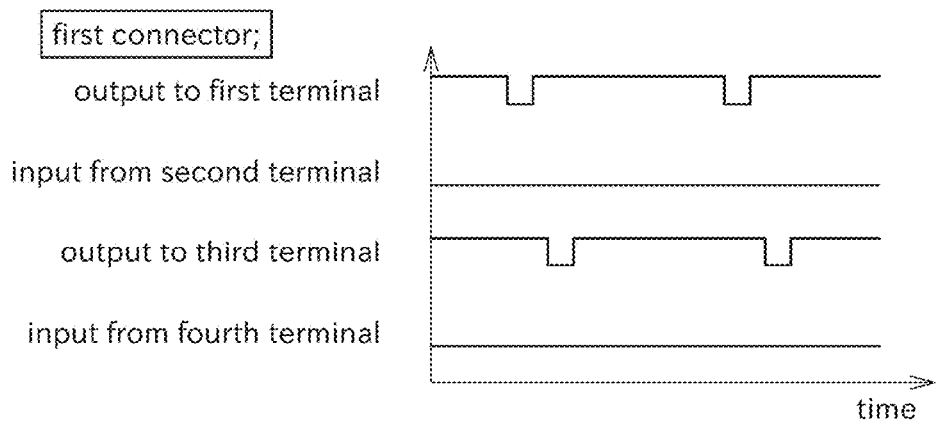
FIG. 5 is a graph showing the pulse signals with the pressure switches in the robot main body open and the pressure switches in the external axis device open.
Figure 5:
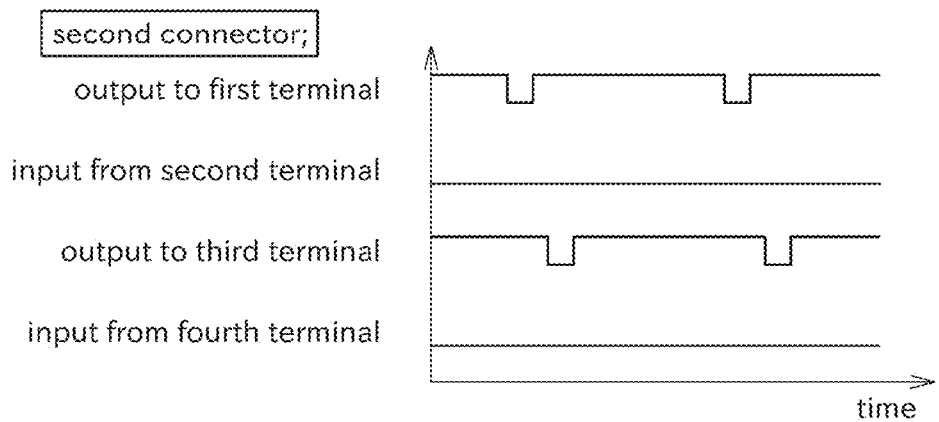
Figure 6:
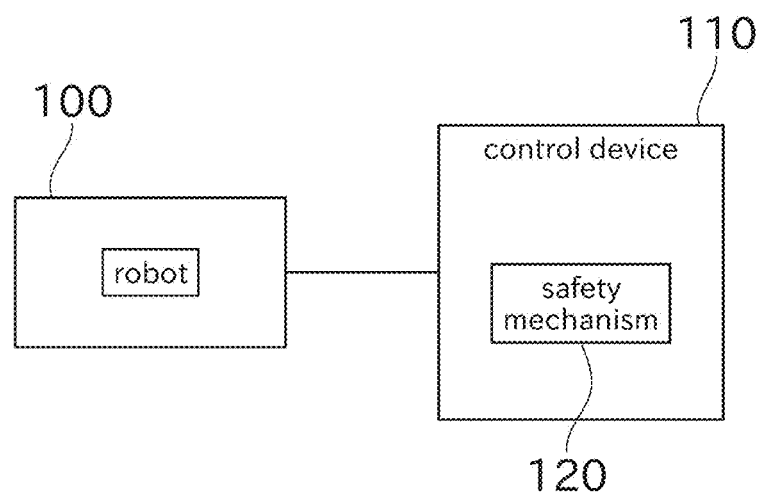
FIG. 6 is a schematic diagram of the robot system.

Now, consider the case of a short-circuit failure in at least any of the pressure switches 11, 12, 21, 22. It is not possible to distinguish between this situation and a case where the pressure switches 11, 12, 21, 22 are normal and the pressure is equal to or above the predetermined value. Considering this, in the safety system 1 of the present embodiment, when the external axis device 20 is connected to the second connector 42 and the safety signal output device 30 has gone to in the emergency stop state in which it does not output the safety signal, each of the determination circuits 31, 32 does not output the safety signal unless both of the pressure switches 11, 12 open as FIG. 5(a) and then they both close, and unless both of the pressure switches 21, 22 open as FIG. 5(b) and then they both close. This makes it possible to determine whether or not a short-circuit failure has occurred in the pressure switches 11, 12, 21, 22, thereby meeting the functional safety needs. However, when the short-circuit member 50 is connected to the second connector 42 (when the pulse signals are alternating), after both of the pressure switches 11, 12 open and then they both close, each of the determination circuits 31, 32 outputs safety signals only depend on the determination about the pressure switches 11, 12. Thus, in this embodiment, if the pressure switches 21, 22 of the external axis device 20 have a short-circuit failure, the safety signal is not output. On the other hand, when the determination about the pressure switches 21, 22 is intentionally disabled by the short-circuit member 50, the safety signals can be output.

As explained above, the safety signal output device 30 of this embodiment monitors electrical signals of two systems input from the robot main body 10 via the first connector 41 and outputs the safety signals based on a result of the monitoring. The safety signal output device 30 includes the second connector 42 to which the external axis device 20 different from the robot main body 10 can be connected. The second connector 42 includes the first terminal, the second terminal, the third terminal, and the fourth terminal. The safety signal output device 30 outputs pulse signals with different timing to the first terminal and third terminal of the second connector 42, respectively. If no electrical signal is input to the safety signal output device 30 from the robot main body 10 on at least one of the two systems on the first connector 41 side, the safety signal output device 30 does not output the safety signal. When electrical signals are input to the safety signal output device 30 from the robot main body 10 on both of the two systems on the first connector 41 side, the safety signal output device 30 operates as follows (A) to (C). (A) During a first state (FIG. 2(b)) in which pulse signals that correspond in timing to the output timing of the pulse signals to the first terminal of the second connector 42 are input to the safety signal output device 30 from the second terminal, and pulse signals that correspond in timing to the output timing of the pulse signals to the third terminal are input to the safety signal output device 30 from the fourth terminal, the safety signals are output. (B) During a second state (FIG. 4), in which pulse signals that correspond in timing to the output timing of the pulse signals to the first terminal of the second connector 42 are input to the safety signal output device 30 from the fourth terminal, and pulse signals that correspond in timing to the output timing of the pulse signals to the third terminal are input to the safety signal output device 30 form the second terminal, the safety signals are output. (C) Even when electrical signals are input to the safety signal output device 30 from the robot main body 10 on both of the two systems, during a state different from either the first state or second state, the safety signal is not output.

Resulting of this, by electrically connecting the first terminal and the fourth terminal of the second connector 42 and electrically connecting the third terminal and the second terminal, the monitoring of the duplexed electrical signals can be properly disabled.

If the safety signal output device 30 of this embodiment has gone to the state in which it does not output the safety signal, even when it subsequently goes to the first state, if a third state is not detected before it goes to the first state, the safety signal is not output. The third state is a state in which pulse signals that correspond in timing to the output timing of the pulse signals to the first terminal of the second connector 42 are not input to the safety signal output device 30 from the second terminal nor from the fourth terminal and pulse signals that correspond in timing to the output timing of the pulse signals to the third terminal are not input to the safety signal output device 30 from the second terminal nor from the fourth terminal.

This allows the system to be adapted to functional safety needs.

In this embodiment, when the short-circuit member 50 is attached to the second connector 42, the first terminal and the fourth terminal of the second connector 42 are connected and the third terminal and the second terminal are connected.

Accordingly, based on the timing of the pulse signal input from the fourth terminal and the second terminal to the safety signal output device 30, it is possible to clearly determine whether the monitoring of the duplexed electrical signal is to be disabled or not.

In this embodiment, the monitoring of electrical signals at the second connector 42 is disabled in the following method. The safety signal output device 30 is configured so that, when electrical signals on both of the two systems are input from the robot main body 10 to the safety signal output device 30, in the state where pulse signals that correspond in timing to the output timing of the pulse signals to the first terminal are input to the safety signal output device 30 from the second terminal or the fourth terminal, and pulse signals that correspond in timing to the output timing of the pulse signals to the third terminal are input to the safety signal output device 30 from the fourth terminal or the second terminal, the safety signal is output. In this method, the short-circuit member 50 is attached to the second connector 42 to electrically connect the first terminal and the fourth terminal and electrically connect the third terminal and the second terminal.

This allows for proper disabling of the duplexed electrical signal monitoring.

While some preferred embodiments of the present invention have been described above, the above-described configuration may be modified, for example, as follows.

It is sufficient for the second connector 42 to include at least a first terminal, a second terminal, a third terminal, and a fourth terminal. The number of terminals of the second connector 42 can be changed arbitrarily as long as it is four or more. The same applies to the first connector 41.

The numbers assigned to each of the terminals in the second connector 42 do not limit the location of the terminals and the location is arbitrary. For example, the fourth terminal may be located next to the first terminal. The terminals may be located far from each other. A terminal for another purpose may be placed between each terminal. The same is true for the terminals in the first connector 41.

The second connector 42 may be configured so that electrical components other than the pressure switches 21, 22 provided by the external axis device 20 can be connected to the second connector 42 in a duplex manner.

Instead of the pressure switches 21, 22 of the external axis device 20, enable switches provided in a duplexed manner by a teach pendant for the robot main body 10, for example, can be connected to the second connector 42. Also, pressure switches provided in a duplexed manner by a different robot main body than the robot main body 10 can be connected to the second connector 42.

The safety signal output device 30 can include a third connector in addition to the second connector 42, and electrical components provided in a duplexed manner by another device may be connected to this third connector. Furthermore, the safety signal output device 30 can be configured to disable input monitoring of the duplexed electrical signals at the third connector by attaching the short-circuit member 50 to the third connector. Similarly, the safety signal output device 30 can be configured to include a fourth connector, a fifth connector, . . . .

The first connector 41 may be omitted and the robot main body 10 may be connected to the safety signal output device 30 in a non-detachable manner.

In the first connector 41, the determination circuits 31, 32 may output pulse signals to the first terminal and the third terminal with different timing (phase) from each other, similarly as in FIG. 2(b) for example.

The second connector 42 may be configured to be arranged at an end drawn from the safety signal output device 30 via a cable of an appropriate length. In this case, at a physical distance from the safety signal output device 30 (for example, near the external axis device 20), the second connector 42 can be connected, disconnected, and confirmed regarding the connection. Thus, convenience can be improved. Like the second connector 42, the first connector 41 may be located at the end of the cable connected to the safety signal output device 30.

In a factory where a number of robot main bodies 10 and external axis devices 20 are arranged, the cables can easily become intricate. In view of this, the second connector 42 can be configured as a relay connector that enables at least one of the input and output of electrical signals between the external axis device 20 and the safety signal output device 30. The relay connector is preferably located on the signal path connecting the external axis device 20 and the second connector 42 and at the part between its ends, preferably in the vicinity of the external axis device 20. In this configuration, by physically linking the short-circuit member 50 to the connector on the side of the corresponding external axis device 20 via a dummy cable, a rope, or the like, it is possible to prevent operational errors in disabling the monitoring of electrical signals with respect to the external axis device 20 that is different from intention.

The safety signal output device 30 of the above embodiment is configured to be compatible with duplexing where electrical signals in two systems are monitored, but it can be compatible with multiplexing where electrical signals in three or more systems are monitored.

The determination circuits 31, 32 in the above embodiment are duplexed, but the safety signal output device 30 may include only one determination circuit in a manner without duplexing.

In the above embodiment, the device in which the safety system 1 is used is a painting device, but is not limited to this.

In view of the foregoing teachings, it is apparent that the present invention can take many modified and variant forms. Accordingly, it is to be understood that the present invention may be practiced in ways other than those described herein within the scope of the appended claims.

DESCRIPTION OF THE REFERENCE NUMERALS

1 Safety system
10 Robot main body (first device)
20 External axis device (second device)
30 Safety signal output device
42 Second connector (connector)
50 Short-circuit member (attachment member)

The invention claimed is:

1. A safety signal output device that monitors electrical signals of a plurality of systems input from a first device and outputs a safety signal based on a result of the monitoring, the safety signal output device comprising:
 a connector to which a second device different from the first device can be electrically connected, wherein
 the connector includes at least a first terminal, a second terminal, a third terminal, and a fourth terminal,
 the safety signal output device outputs electrical signals with different timing to the first terminal and the third terminal respectively,
 if an electrical signal of the electric signals is not input from the first device to the safety signal output device in at least one of the plurality of systems, the safety signal output device does not output the safety signal,
 if the electrical signals are input to the safety signal output device from the first device in all of the plurality of systems,
  during a first state in which electrical signals that correspond in timing to the output timing of the electrical signals to the first terminal are input to the safety signal output device from the second terminal, and electrical signals that correspond in timing to the output timing of the electrical signals to the third terminal are input to the safety signal output device from the fourth terminal, the safety signal output device outputs the safety signal,
  during a second state in which electrical signals that correspond in timing to the output timing of the electrical signals to the first terminal are input to the safety signal output device from the fourth terminal, and electrical signals that correspond in timing to the output timing of the electrical signals to the third terminal are input to the safety signal output device from the second terminal, the safety signal output device outputs the safety signal, and
 even when electrical signals are input to the safety signal output device from the first device in all of the plurality of systems, during a state different from either the first state or the second state, the safety signal output device does not output the safety signal.

2. The safety signal output device according to claim 1, wherein
 if the safety signal output device has gone to a state in which it does not output the safety signal, even when it subsequently goes to the first state, the safety signal output device does not output the safety signal if a third state is not detected before it goes to the first state, the third state being a state in which electrical signals that correspond in timing to the output timing of the electrical signals to the first terminal are not input to the safety signal output device from the second terminal nor from the fourth terminal and electrical signals that correspond in timing to the output timing of the electrical signals to the third terminal are not input to the safety signal output device from the second terminal nor from the fourth terminal.

3. The safety signal output device according to claim 1, wherein
the connector is located at an end of a cable connected to the safety signal output device.

4. The safety signal output device according to claim 3, wherein
the connector is a relay connector that allows at least any of input and output of electrical signals between the second device and the safety signal output device.

5. An attachment member attachable to the connector of the safety signal output device according to claim 1, wherein
when the attachment member is attached to the connector, the attachment member electrically connects the first terminal to the fourth terminal and electrically connects the third terminal to the second terminal.

6. A safety system comprising:
the safety signal output device according to claim 1; and
an attachment member attachable to the connector of the safety signal output device, wherein
when attached to the connector, the attachment member electrically connects the first terminal to the fourth terminal and electrically connects the third terminal to the second terminal.

7. A method for disabling monitoring of electrical signals at a connector in a safety signal output device that outputs a safety signal based on a monitoring result, wherein
the safety signal output device monitors electrical signals of a plurality of systems input from a first device,
the safety signal output device monitors electrical signals of a plurality of systems output from a second device different from the first device,
the safety signal output device includes the connector to which the second device can be electrically connected,
the connector includes at least a first terminal, a second terminal, a third terminal, and a fourth terminal,
the safety signal output device is configured so that, when electrical signals are input to the safety signal output device from the first device in all of the plurality of systems, in a state in which electrical signals that correspond in timing to timing of electrical signals output to the first terminal are input to the safety signal output device from the second terminal or the fourth terminal, and electrical signals that correspond in timing to timing of electrical signals output to the third terminal are input to the safety signal output device from the fourth terminal or the second terminal, the safety signal output device outputs the safety signal, and
in the method, by attaching an attachment member to the connector, the first terminal and the fourth terminal are electrically connected, and the third terminal and the second terminal are electrically connected.

* * * * *